United States Patent [19]

Bachalo

[11] Patent Number: 5,293,162
[45] Date of Patent: Mar. 8, 1994

[54] LASER BASED TRACKING DEVICE FOR DETECTING THE DISTANCE BETWEEN A VEHICLE AND A ROADWAY MARKER

[76] Inventor: William D. Bachalo, Sunnyvale, Calif.

[21] Appl. No.: 847,378

[22] Filed: Mar. 9, 1992

[51] Int. Cl.$^5$ .............................................. G08G 1/09
[52] U.S. Cl. ..................................... 340/905; 250/236; 250/561; 340/901
[58] Field of Search ............ 340/901, 904, 905, 425.5, 340/436, 438, 439, 457, 933, 942, 435; 250/202, 236, 235, 561; 356/5

[56] References Cited

U.S. PATENT DOCUMENTS

| | | |
|---|---|---|
| 2,750,583 | 6/1956 | McCollough . |
| 3,201,750 | 8/1965 | Morin . |
| 3,692,414 | 9/1972 | Hosterman et al. ................ 250/236 |
| 3,708,668 | 1/1973 | Tilley . |
| 3,739,179 | 6/1973 | Krekow . |
| 4,143,264 | 3/1979 | Gilbert et al. . |
| 4,329,011 | 5/1982 | Mori et al. .......................... 250/236 |
| 4,348,652 | 9/1982 | Barnes et al. . |
| 4,456,829 | 6/1984 | Fohey ................................. 250/235 |
| 4,568,825 | 2/1986 | Wurster . |
| 4,721,389 | 1/1988 | Dejaiffe . |
| 4,770,526 | 9/1988 | Manhart et al. ........................ 356/5 |
| 4,786,164 | 11/1988 | Kawata . |
| 4,797,558 | 1/1989 | West ................................... 250/236 |
| 4,926,171 | 5/1990 | Kelley ................................. 340/961 |
| 4,970,509 | 11/1990 | Kissinger, Sr. ..................... 340/901 |
| 5,006,721 | 4/1991 | Cameron et al. .................... 250/561 |
| 5,015,868 | 5/1991 | Park .................................... 250/561 |
| 5,056,914 | 10/1991 | Kolledge .................................. 356/5 |
| 5,075,878 | 12/1991 | Ohtomo et al. .......................... 356/5 |

Primary Examiner—Brent Swarthout
Attorney, Agent, or Firm—Merchant, Gould, Smith, Edell, Welter & Schmidt

[57] ABSTRACT

A laser tracking device for the warning of vehicle weaving and steering assistance of vehicles, includes a laser generation apparatus for generating and transmitting a laser beam. A mirror is provided for sweeping the laser beam across a roadway surface. The mirror also receives a reflection of the laser beam back from a roadway marker located on the roadway surface and directs it to a receiver. A master clock is coupled to the mirror for generating a first timing signal when the laser beam starts to sweep across the roadway surface. The receiver generates a second timing signal when the reflected laser beam is incident on it. A processor is coupled to the receiver and the master clock. The processor compares the first timing signal with the second timing signal. The processor uses the results of that comparison to calculate the distance between the vehicle and the roadway marker. That information can be used to control the direction and steering of the vehicle in order to prevent weaving, unintentional lane changes as well as other problems leading to accidents and collisions.

4 Claims, 4 Drawing Sheets

LASER BASED TRACKING DEVICE FOR DETECTING THE DISTANCE BETWEEN A VEHICLE AND A ROADWAY MARKER

FIELD OF THE INVENTION

The present invention relates to the field of laser-based tracking devices, and more specifically to a device for detecting the distance between a vehicle and a roadway marker.

PRIOR ART

Traffic accidents in the United States cause thousands of deaths and injuries every year. Quite often these accidents are caused because of a driver who has become inattentive or distracted while steering the vehicle. Numerous additional accidents occur as a result of driver fatigue.

Accordingly, it has long been an object of inventors and industry to provide a device that would automatically calculate the distance between a moving vehicle and a roadway marker. The roadway marker is typically the preexisting painted stripes that form the lane dividers on roads and highways. The tracking device could be eventually adapted to assist a driver in the steering and control of the vehicle in order to reduce the chance of accidents and collisions.

Many devices are known in the prior art that are directed toward the problem of vehicle control and automatic steering. Most of these methods have the serious drawback that they require special construction and modification to existing roadways. For example, U.S. Pat. No. 2,750,583 describes a system that requires that a guideline or path of radioactive material be placed on the roadway. The environmental and public opposition to placing radioactive material on the public roadways would preclude the use of such a system.

The devices in the prior art generally cannot be fitted onto existing vehicles and used with the existing roadways. The necessary modifications required by the prior art are quite obviously undesirable as the cost of implementing them in all existing roadways would be prohibitively large.

SUMMARY OF THE PRESENT INVENTION

The present invention overcomes the limitations of the prior art by providing a laser based tracking device that functions well with existing roadway construction. There is no need to build special items or to lay special cables to enable the tracking device to work.

The present invention therefore, in a broad sense, is a laser tracking device, which includes a laser generation apparatus for generating and transmitting a laser beam. A mirror is provided for sweeping the laser beam across a roadway surface. The mirror also receives a reflection of the laser beam back from the roadway surface and directs it to a receiver. A master clock is coupled to the mirror for generating a first timing signal when the laser beam starts to sweep across the roadway surface. The receiver generates a second timing signal when the reflected laser beam is incident on it. A processor is coupled to the receiver and the master clock. The processor compares the first timing signal with said the second timing signal. The processor uses the results of that comparison to calculate the distance between the vehicle and the roadway marker. That information can be used to control the direction and steering of the vehicle in order to prevent accidents and collisions.

DETAILED DESCRIPTION OF THE PREFERRED EMBODIMENT

A novel laser tracking device is described for the warning of vehicle weaving and the steering assistance of vehicles. In the following description, for the purposes of explanation, specific construction details, arrangements, and component descriptions are set forth in order to provide a more thorough understanding of the present invention. It will be apparent to those skilled in the art, however, that the present invention may be practiced without these specific details. In other instances, well known components and structures have not been described in detail so as not to obscure the present invention unnecessarily.

Figure 1:
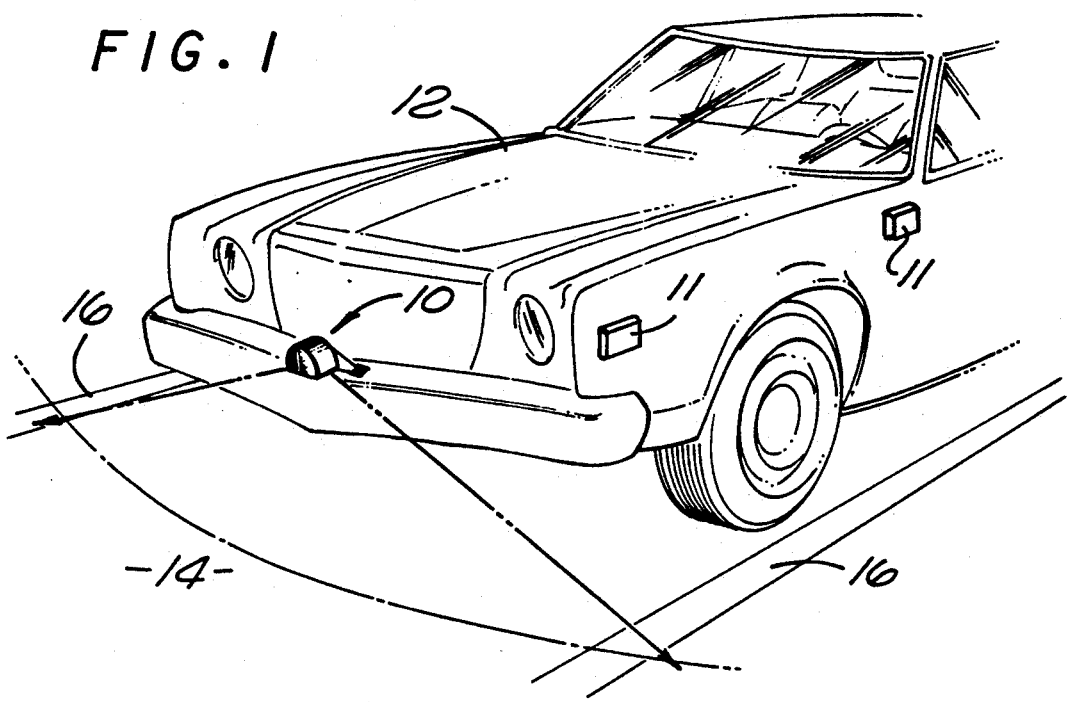
FIG. 1 is a schematic view illustrating the tracking device mounted on an automobile, and the laser beam interacting with the roadway surface.

Referring first to FIG. 1, a schematic view illustrating how the laser tracking device 10 is mounted on an automobile 12 is shown. The tracking device 10 is mounted on any convenient point on the automobile. FIG. 1 shows the tracking device 10 located on the front bumper of the automobile 12. The tracking device can also be mounted in other locations. It could, for example, be mounted on the side of the automobile 12. Several alternative mounting locations are illustrated in FIG. 1 by the reference numeral 11. It is to be understood that these are not the only alternative locations where the tracking device could be mounted. The mounting point is chosen such that the laser beam that is generated by the tracking device 10 can be easily and readily swept across the surface of the roadway 14. The dashed line in FIG. 1 illustrates the path of the laser beam across the roadway surface. The exact mounting point of the tracking device will vary, depending on factors such as vehicle construction, expected roadway conditions, and the like, but will be readily apparent to those skilled in the art.

Although the following specification includes the description of a roadway surface and roadway markers located thereon, it is to be understood that the roadway and roadway markers are not to be considered a part of the invention. The descriptions of these additional items are included solely to aid in the understanding of the present invention. The invention itself is made up of the laser tracking device as described.

As noted above, and referring again to FIG. 1, one of the purposes of the present invention is to measure the distance between the automobile 12 and the roadway markers 16 that are present on the surface of the roadway 14. The roadway markers 16 can take a variety of forms. They include painted stripes, round reflective markers (known as "Botts Dots") and square ceramic block reflectors. In this description, all of the roadway markers will be referred to with the generic reference numeral 16.

The present invention takes advantage of the fact that the paint for the roadway stripes has imbedded inside it a large number of spherical glass beads that act as retro-reflectors. The beads are sprayed onto the paint while it is wet, thereby insuring that the beads remain in place permanently. This mix of paint and glass beads is commonly used on streets and highways throughout the United States today. The beads produce a much higher retro-reflected signal than the surrounding, unpainted, surface of the roadway. When the laser beam illuminates the painted stripe, the glass beads cause a large portion of the laser light to be reflected. As a result, the light that returns to the tracking device is much easier to detect.

Although the present invention takes advantage of abovedescribed feature of the paint, it will be apparent to those skilled in the art that it is not necessary for the roadway marker to have the impregnated glass beads in order for the tracking device to operate. Appropriate amplifiers and filters can be used to pick up the reflected laser signal from a variety of roadway markers.

Figure 2:
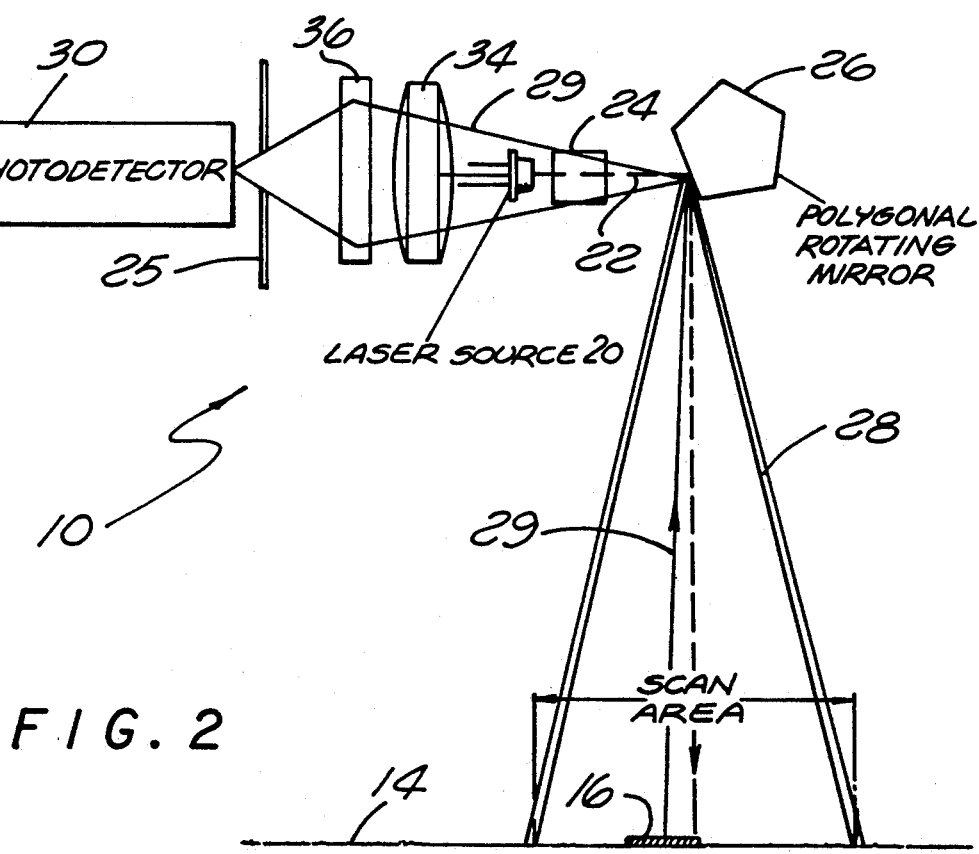
FIG. 2 illustrates the preferred embodiment of the optical elements of the tracking device.

Referring next to FIG. 2, a schematic view of the preferred embodiment of the optical elements of the tracking device 10 is shown. A laser light source 20 is provided to generate and transmit the laser beam 22. In the preferred embodiment, the laser light source 20 is a solid state laser diode. The laser diode is the preferred choice for generating the laser beam because of its small size, long life, and relatively low cost. Laser diodes also have low power consumption and can withstand the vehicle environment. It will be apparent to those skilled in the art, however, that alternative means can be used to generate the laser beam with equal effectiveness. Regardless of the type of laser source that is used, the laser light source will be chosen to have a sufficient power level. This is because the roadway markers (especially the painted lines) will not always be in good condition, and it is desirable for the reflected laser beam to have a high signal to noise ratio under a variety of roadway conditions.

After the laser beam 22 is generated it passes through a collimating lens 24. The collimating lens 24 collimates the beam and directs it to a polygonal mirror 26. The mirror 26 is mounted and aligned such that the laser beam is reflected onto the roadway. The mirror 26 is attached to a motor (not shown in FIG. 2) and rotates at a predetermined rate in order to repeatedly "sweep" the laser beam across the roadway surface. In the preferred embodiment, the mirror has the shape of a pentagon. It will be apparent that mirrors having a different number of sides can also be used to sweep the laser beam. Additionally, means other than a mirror can be used to sweep the laser beam across the roadway surface. For example, an acousto-optic modulator (AOM) may also be used.

The laser beam is directed onto the roadway surface 14. In FIG. 2, the incident laser beam is represented by the dashed line, and is given by the reference numeral 22. The laser beam scans over a portion of the roadway surface 14. The boundaries of the scan area are represented by the solid double lines in FIG. 2, and given the reference numeral 28. If there is a roadway marker 16 within the scan area, then the laser light will be reflected back to the mirror 26. The reflected laser beam is represented by the solid line in FIG. 2, and given the reference numeral 29. From the mirror, the reflected beam 28 is directed to a receiver 30. The use of the same mirror to transmit and receive the laser light significantly simplifies the alignment of the optical system, and results in a corresponding increase in reliability. A single mirror also results in increased signal to noise ratio for the reflected beam and an increase in the size of the scan area. It will be apparent to those skilled in the art, however, that a separate receiving mirror can be used to pick up the reflected light.

Appropriate filters and lenses may be placed between the mirror 26 and the receiver 30. In the preferred embodiment, as illustrated in FIG. 2, a focusing lens 34 and filter 36 are used. It will be apparent to those skilled in the art that these components may be changed or eliminated as circumstances dictate. It is anticipated that different tracking devices will use lasers of different frequencies. Then, filters can be used to admit only the particular wavelength of laser light associated with the given tracking device. This will minimize the chance of interference or crosstalk between tracking devices on adjacent vehicles.

In the preferred embodiment, the laser light source 20 does not generate a continuous laser beam. The laser beam is pulsed at a high frequency by switching the laser diode on and off. Laser diodes can be pulsed at frequencies up to several hundred megahertz. The laser energy per pulse is higher than when operating in a continuous mode. This has two advantages in the present invention. First, the strength of the signal that eventually reaches the receiver is greater. Secondly, the receiver can be synchronized with the laser to block out other signals. It is possible to operate tracking devices on different vehicles at different laser pulse rates so as to minimize the chance of interference between tracking devices on adjacent vehicles. It will be apparent to those skilled in the art, however, that pulsing is not absolutely necessary, and the alternative embodiment may also be operated in a continuous wave mode.

The receiver 30 is a photodetector that generates an electrical signal whenever it is illuminated by the reflected laser beam 28. Solid state detectors such as PIN diodes, avalanche photodiodes (APDs) and charge coupled device (CCD) arrays are ideally suited for use with the laser diodes. Such devices have a very high quantum efficiency at the laser wavelength. They are also small and rugged and require only very low electrical current levels for operation. The exact type of device that is used for the receiver 30 will vary according to the optical scheme that is used for the tracking device 10, but will be readily apparent to those skilled in the art.

When the laser beam is scanned across the surface of the roadway 14, care must be taken to insure that the scanning rate is sufficient to detect the roadway markers 16. In order to cover the normal vehicle speed ranges found on today's highways, it has been found that only a moderate scanner frequency is required. In the longitudinal direction of vehicle travel, the scan rate must be sufficient to detect the smallest roadway marker at the fastest expected vehicle speed. The most demanding case (neglecting seriously deteriorated paint lines) is the reliable detection of the raised type of roadway markers 16, such as the Botts Dots and square reflective blocks. The minimum longitudinal standard size for such markers is approximately 4 inches. Thus, at a speed of 95 ft/sec (or 65 mph), the minimum scanner frequency (designated $F_{min}$) can be calculated as:

$$F_{min} = (95 \text{ ft/sec})(12 \text{ in/ft})/(4 \text{ in})$$
$$= 286 \text{ Hz}$$

In the preferred embodiment, the scanner is operated at a rate of approximately 1 kHz so that at least three direct passes over each marker is realized.

When a pulsed laser beam is used, it is also necessary to insure that the pulse frequency is chosen so that the position of the laser beam is sampled a sufficient number of times. As with the longitudinal scan rate, the minimum pulse frequency can be calculated from the roadway characteristics. Standard lane width in current use varies from 10 to 12 feet. Therefore a safe scan width of 6 feet (or 72 inches) is chosen. Traffic stripes and other roadway markers 16 have a width of approximately 4 inches. In the preferred embodiment, it is desired to have approximately 10 detection points across the width of the roadway marker, for a lateral pulse resolution of 0.4 inches. The minimum number of pulses per scan (designated as $P_{min}$) is calculated to be:

$$P_{min} = (72 \text{ in}/0.4 \text{ in})(10 \text{ pulses/scan})$$
$$= 1800 \text{ pulses/scan}$$

Recalling that the scan rate is 1 kHz, the minimum pulse rate (designated as $R_{min}$) is:

$$R_{min} = (1800 \text{ pulses/scan})(1,000 \text{ scan/sec})$$
$$= 1800 \text{ kHz}$$
$$2 \text{ MHz}$$

Laser Diodes are currently available that can easily achieve this pulse rate.

Different scanning and pulse frequencies can be utilized, and those of skill in the art will be able to able to calculate such rates according to the methods described above.

The foregoing has described how the preferred embodiment of the mechanical and optical components of the tracking device 10 are arranged. Next, the electrical components of the tracking device 10 will be described.

Figure 3:
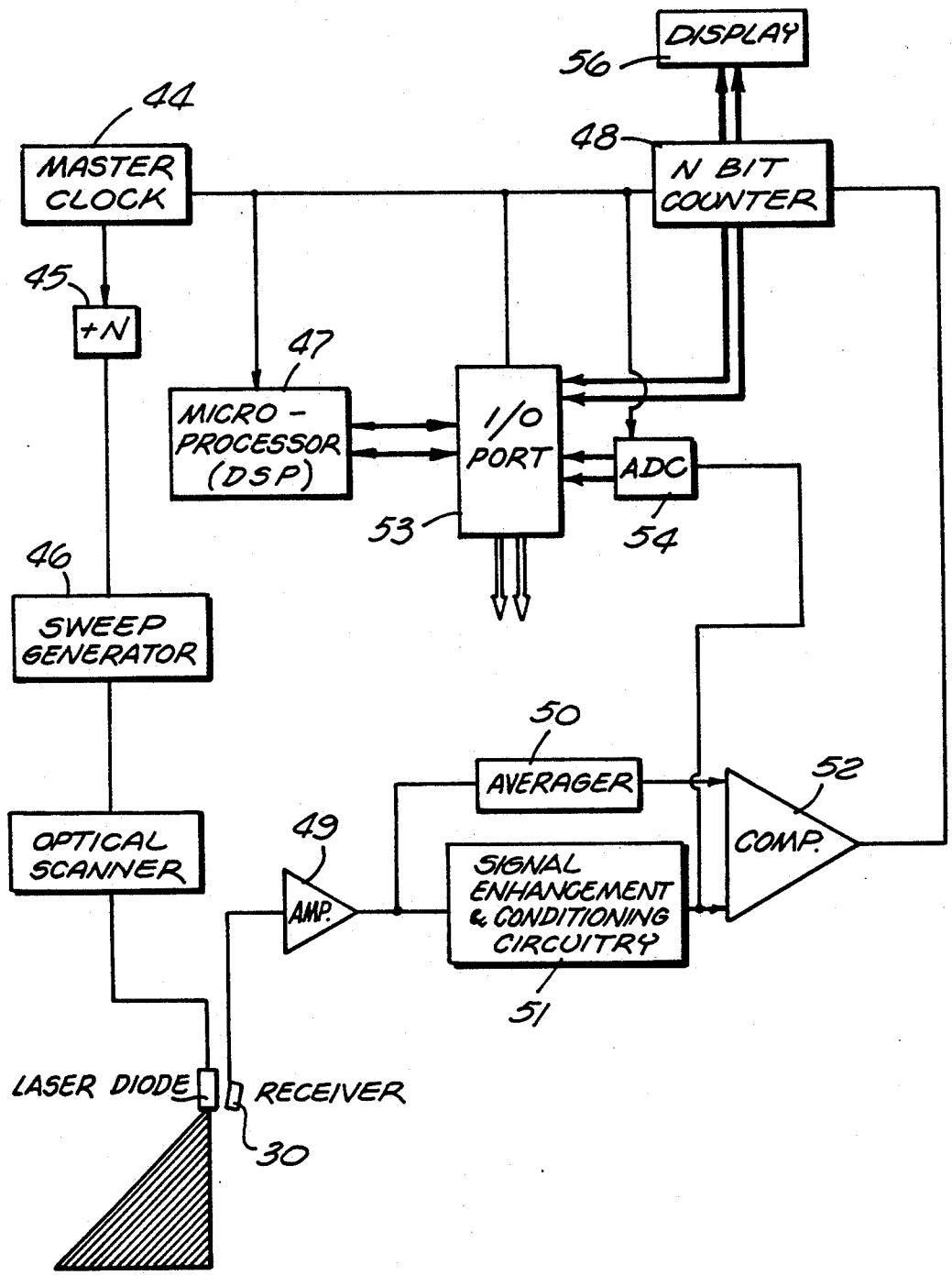
FIG. 3 is a block diagram of the electrical components of the tracking device.

A block diagram of the major electrical components of the tracking device 10 is shown in FIG. 3. A master clock 44 is provided to generate timing signals. The master clock has an appropriate frequency to maintain and monitor the synchronization between the system signals. The exact frequency of the master clock will depend on factors such as the desired scanning rate, and the maximum vehicle speed. One output from the master clock is coupled to divider 45. The divider 45 divides the clock frequency down to an appropriate level before it is supplied to the sweep generator 46. The sweep generator 46 in the preferred embodiment is motor 55. Coupled to the sweep generator 46 is the rotating mirror, as described above with reference to FIG. 2. Other outputs from the master clock are coupled to the microprocessor 47 and the N-bit counter 48.

The reflected laser beam 28 is detected by the receiver means 30. When the receiver 30 is illuminated by the laser beam, it generates a timing signal. This signal is amplified by amplifier 49. A number of smoothing and signal processing strategies can be employed to provide optimum performance under a wide variety of conditions. As shown in FIG. 3, the preferred embodiment uses averager 50, signal enhancement and conditioning circuitry 51 and comparator 52 to filter the output of the receiver 30 and insure that a signal is generated only when the laser beam encounters a roadway marker. The output of the comparator 52 is coupled to the N-bit counter 48.

Operation of the circuit illustrated in FIG. 3 is straightforward. The signal from the master clock 44 will indicate when the mirror is beginning each sweep of the laser beam. The N-bit counter 48 resets and begins counting clock pulses each time this first timing signal is issued. When a roadway marker reflects the laser beam onto the receiver, the output of the comparator sends a second timing signal to the N-bit counter 48 (as described above). The counter stops counting and outputs its value to the microprocessor 47. The value of the counter will be proportional to the lateral position of the roadway marker relative to the tracking device 10. The I/O port 53 and the analog to digital convertor (ADC) 54 are also used in conjunction with the microprocessor to determine the lateral position of the roadway marker. The output of the counter 48 may be supplied to a display 56 for the user of the vehicle.

Figure 5:
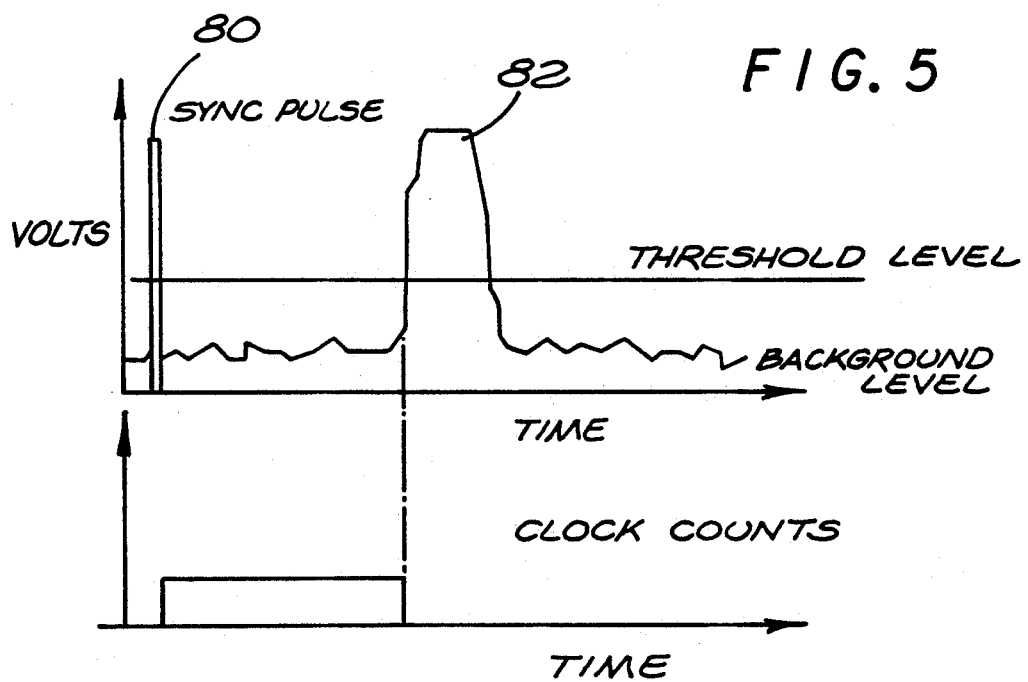
FIG. 5 is a timing diagram showing the relationship between the timing signals used in the present invention.

FIG. 5 illustrates a sample timing diagram and demonstrates the relationship between the timing signals used in the present invention. In FIG. 5(a) the sync pulse 80 is the first timing signal that is generated by the master clock. The receiver output level is illustrated by the solid line. The receiver pulse is generated when the laser beam illuminates the receiver. As the strength of the receiver output passes a predetermined threshold level, the counter is turned off. In FIG. 5(b), the clock counts are illustrated between the time the sync pulse is generated and the detection of the reflected laser beam by the receiver.

Figure 6:
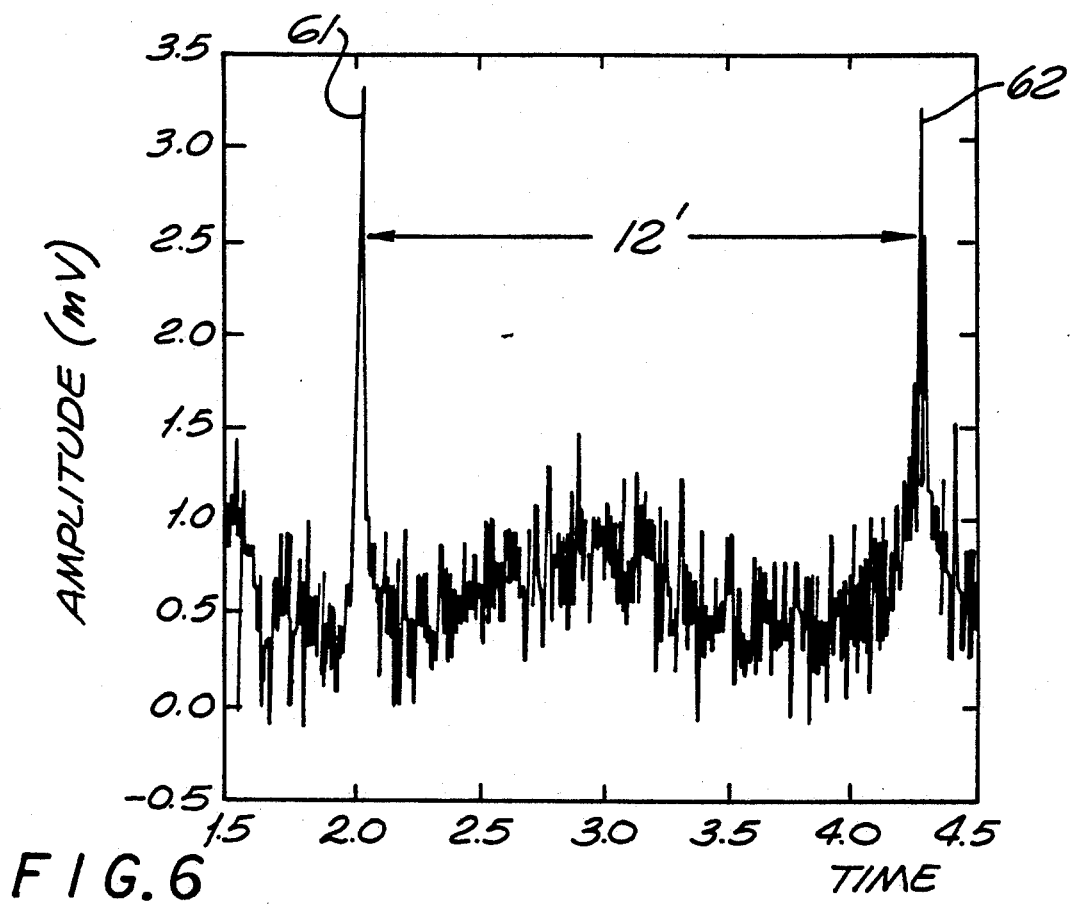
FIG. 6 illustrates a sample trace display of an oscilloscope that is connected to the output of the photodetector in the preferred embodiment.

FIG. 6 illustrates a sample trace display of an oscilloscope that is connected (through an amplifier) to the output of the photodetector 30. The display illustrates the signal generated when the tracking device detects the presence of painted stripes on the roadway surface. The two spikes 61 and 62 on the oscilloscope display are the result of the high intensity reflection from the glass beads in the painted strips.

The microprocessor 47 contains suitable logic to process the signal from the receiver 30 and calculate the distance from the vehicle 12 to the roadway marker 16. The microprocessor also has logic programmed to maintain a running average over a given number of sample locations and reject false detections. This feature may be important when deteriorating roadway conditions are encountered. An advanced tracking system could use the information calculated by the microprocessor to control the steering of the vehicle, and prevent collisions.

Figure 4:
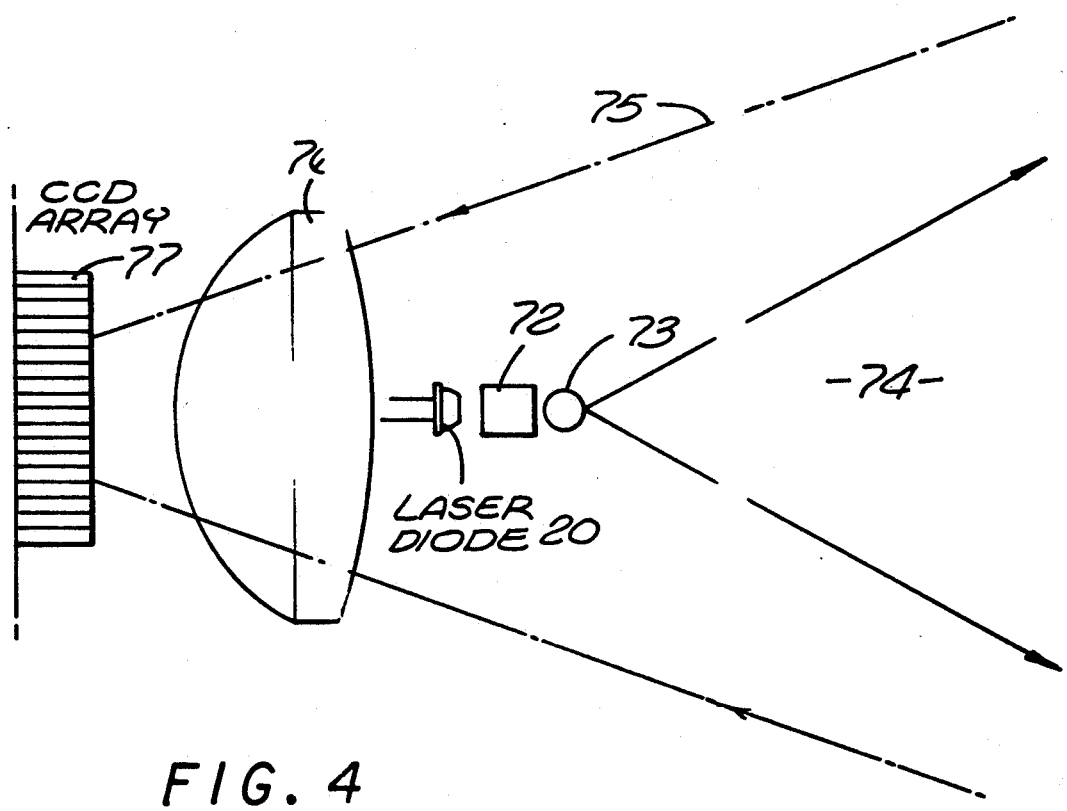
FIG. 4 illustrates an alternative embodiment of the optical elements of the tracking device.

Referring next to FIG. 4, an alternative embodiment of the optical system for the tracking device is illustrated. The alternative embodiment differs from the preferred embodiment in that the laser beam does not sweep across the roadway. Instead, a lens is used to create a "laser sheet" which uniformly illuminates the roadway. The laser beam is again produced by a laser generation means 20, which is preferably a laser diode. The laser beam passes through collimating 72 and cylindrical 73 lenses to produce the laser sheet 74.

The laser sheet 74 illuminates the roadway 14. The presence of a roadway marker 16 on the surface of the roadway 14 will cause a portion of the laser signal to be reflected back to the tracking device 10. In FIG. 4, the reflected laser signal is represented by the dashed line and given the reference numeral 75. In FIG. 4, two such dashed lines are shown to indicate the range of locations from which the reflected beam may be incident on the tracking device. The reflected laser beam 75 passes through a focussing means which focuses it on the receiver 77. The preferred focusing means is an aspheric lens. In this alternative embodiment, the receiver is an array of discrete charge coupled devices (CCDs). Each CCD has the property of generating an electrical signal when it is illuminated by a laser beam. The CCD array is periodically sampled to determine if a roadway marker has been detected. The CCD array is sampled sequentially, and its output is quite similar to that shown in FIG. 5. For this reason then, output of the CCD array can be processed with a circuit that is similar to that illustrated in FIG. 3.

Figure 7:
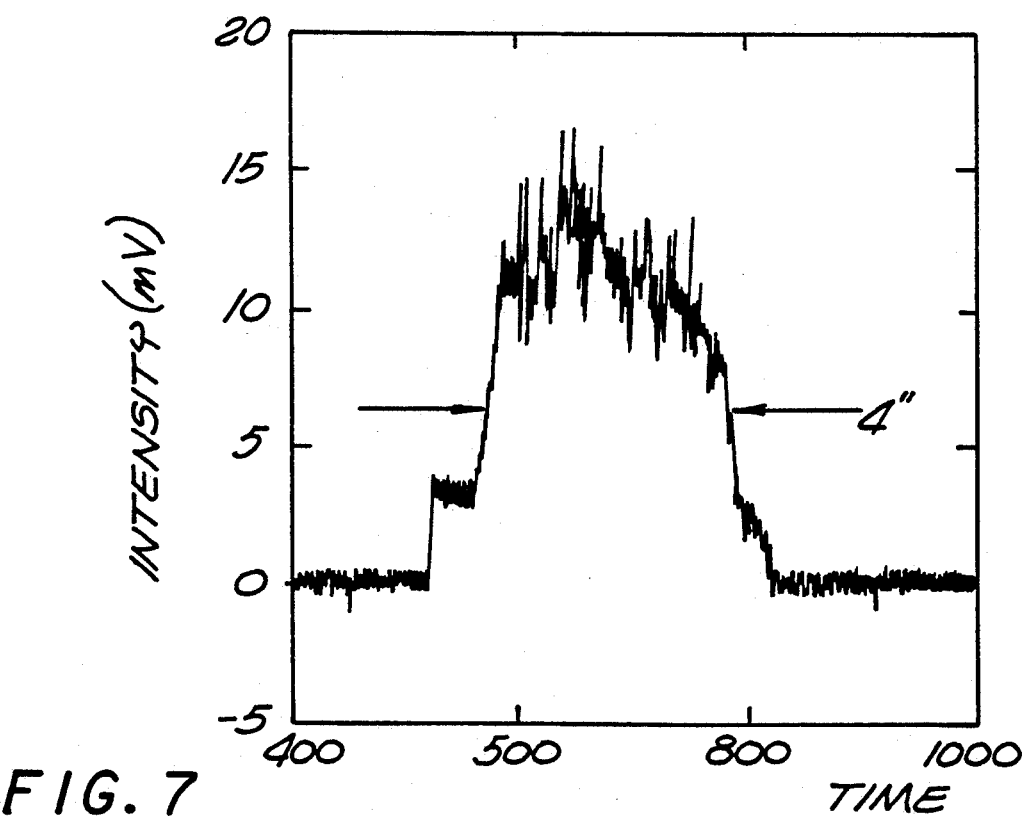
FIG. 7 illustrates a sample trace display of an oscilloscope that is connected to the output of the photodetector in the alternative embodiment of the optical system.

FIG. 7 illustrates a sample trace display of an oscilloscope that is connected (through an amplifier) to the output of the CCD array 77. The display illustrates the signal generated when the tracking device detects the presence of a single painted stripe on the roadway surface. The raised central portion of the signal indicates that the four inch width of the stripe and its relation to the vehicle is easily detected.

Accordingly, a novel laser tracking device for the warning of vehicle weaving and the steering assistance of vehicles has been described. This description has been made with reference to specific exemplary embodiments thereof. It will, however, be readily apparent to those skilled in the art that various modifications and changes may be made thereto without departing from the overall spirit and scope of the invention. The specification and accompanying drawings, therefore, are to be regarded as illustrative rather than restrictive. The full scope of the present invention is limited only by the following claims.

What is claimed is:

1. A laser tracking device for determining the distance between a vehicle and a roadway marker on the surface of a roadway, comprising:
    a laser diode for generating and transmitting a laser beam;
    a rotating polygonal mirror coupled to a controllable motor, said mirror being located within an optical path of said laser beam, for sweeping said laser beam across said roadway surface, said mirror also receiving a reflection of said laser beam back from said roadway surface, and directing said reflected laser beam to a receiver means;
    master clock means coupled to said controllable motor for generating a first timing signal and issuing a series of timing pulses when said laser beam starts to sweep across said roadway surface;
    counter means coupled to said master clock means, said counter means beginning to count said timing pulses when said master clock means generates said first timing signal, said counter means continuing to count said timing pulses concurrently as said laser beam sweeps across said roadway surface;
    wherein said receiver means generates a second timing signal when said reflected laser beam is incident on it, and wherein said counter ceases counting upon said generation of said second timing signal; and
    microprocessor means coupled to said receiver means and said master clock means for analyzing the number of said timing pulses counted by said counter means between generation of said first and second timing signals so as to calculate a distance between said tracking device and said roadway marker.

2. The device of claim 1 wherein said tracking device is mounted on a vehicle.

3. A method for determining the distance between a vehicle and a roadway marker, comprising the steps of:
    (a) generating a laser beam;
    (b) sweeping said laser beam across a roadway surface;
    (c) generating a first timing signal and a series of timing pulses when said laser beam starts to sweep across said roadway surface;
    (d) counting said timing pulses concurrently as said laser beam sweeps across said roadway surface;
    (e) receiving a reflection of said laser beam from said roadway marker on said roadway surface;
    (f) generating a second timing signal when said reflection is received;
    (g) stopping the count of said timing pulses when said second timing signal is generated;
    (h) analyzing the number of said timing pulses counted between generation of said first and second timing signals so as to determine the distance between said vehicle and said roadway marker.

4. A laser tracking device, comprising:
    laser generation means for generating and transmitting a laser beam;
    laser steering means for sweeping said laser beam across a roadway having at least one roadway marker located thereon, said laser beam being reflected by said roadway marker, said laser steering means also receiving said reflection of said laser beam back from said surface, and directing said reflected laser beam to a receiver means;
    master clock means coupled to said laser steering means for generating a first timing signal and issuing a series of timing pulses when said laser beam starts to sweep across said surface;
    counter means coupled to said master clock means, said counter means beginning to count said timing pulses when said master clock means generates said first timing signal, said counter means continuing to count said timing pulses concurrently as said laser beam sweeps across said roadway surface;
    wherein said receiver means generates a second timing signal when said reflected laser beam is incident on it, and wherein said counter ceases counting upon said generation of said second timing signal; and
    processor means coupled to said receiver means and said master clock means for analyzing the number of said timing pulses counted by said counter means between generation of said first and second timing signals so as to calculate a distance between said laser tracking device and said roadway marker.

* * * * *